(12) United States Patent
Janssen et al.

(10) Patent No.: US 11,277,982 B2
(45) Date of Patent: Mar. 22, 2022

(54) METHOD FOR GROWING PLANTS (71) Applicant: ROCKWOOL INTERNATIONAL A/S, Hedehusene (DK)

(72) Inventors: Frank Hendrikus Peter Janssen, Helden (NL); Paul Jacques L. H. Bouwens, Vught (NL); Daan De Kubber, Roermond (NL)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 85 days.

(21) Appl. No.: 14/772,148

(22) PCT Filed: Mar. 7, 2014

(86) PCT No.: PCT/EP2014/054460
§ 371 (c)(1),
(2) Date: Sep. 2, 2015

(87) PCT Pub. No.: WO2014/135681
PCT Pub. Date: Sep. 12, 2014

(65) Prior Publication Data
US 2015/0373924 A1 Dec. 31, 2015

(30) Foreign Application Priority Data
Mar. 7, 2013 (EP) .................................... 13158207

(51) Int. Cl.
*A01G 24/18* (2018.01)
*A01G 24/35* (2018.01)
(Continued)

(52) U.S. Cl.
CPC ............ *A01G 24/18* (2018.02); *A01G 9/021* (2013.01); *A01G 9/029* (2018.02); *A01G 24/35* (2018.02); *A01G 24/44* (2018.02)

(58) Field of Classification Search
CPC ...... A01G 9/021; A01G 1/001; A01G 31/001; A01G 9/029; A01G 9/0291; A01G 24/00;
(Continued)

(56) References Cited

U.S. PATENT DOCUMENTS 3,513,593 A * 5/1970 Beck .................. A01G 24/44
47/87
3,834,072 A * 9/1974 Rack .................. A01G 20/00
47/74
(Continued)

FOREIGN PATENT DOCUMENTS

EP 1210866 B1 * 4/2006 ............. A01G 24/28
SU 640705 A1 1/1979
(Continued)

OTHER PUBLICATIONS

International Search Report corresponding to Int'l App. No. PCT/EP2014/054460; completed on Jul. 28, 2014; 2 pages.
(Continued)

*Primary Examiner* — Ebony E Evans
(74) *Attorney, Agent, or Firm* — Tarolli, Sundheim, Covell & Tummino LLP (57) ABSTRACT

The invention relates to a coherent propagation growth substrate product (1) formed of man-made vitreous fibres (MMVF), the product (1) having two opposed top and bottom surfaces and at least one cavity (2) which is open at the top surface and which extends from the top surface towards the bottom surface, wherein a superabsorbent polymer (3) is provided in the cavity (2).

9 Claims, 3 Drawing Sheets (51) Int. Cl.
*A01G 24/44* (2018.01)
*A01G 9/029* (2018.01)
*A01G 9/02* (2018.01)

(58) Field of Classification Search
CPC ........ A01G 24/18; A01G 24/35; A01G 24/44; A01G 24/46; A01G 24/60
USPC ...... 47/66.7, 59 R, 59 S, 64, 73–75, 77, 901
See application file for complete search history.

(56) References Cited

U.S. PATENT DOCUMENTS

| | | | | |
|---|---|---|---|---|
| 3,973,355 A * | 8/1976 | McKenzie | ........... | A01G 9/1086 47/57.6 |
| 4,241,537 A | 12/1980 | Wood | | |
| 4,357,884 A * | 11/1982 | Rast, Jr. | ............. | A01G 13/0268 111/114 |
| 4,586,288 A | 5/1986 | Walton | | |
| 4,777,763 A * | 10/1988 | Shannon | .............. | A01G 31/001 47/64 |
| 4,786,550 A * | 11/1988 | McFarland | ........... | A01C 1/044 442/118 |
| 4,959,926 A * | 10/1990 | Moffet, Jr. | ........... | A01G 31/001 47/59 R |
| 5,035,080 A * | 7/1991 | Kafka | .................. | A01G 31/001 47/59 R |
| 5,037,470 A * | 8/1991 | Matzen | ................ | A01G 31/001 501/35 |
| 5,060,419 A * | 10/1991 | de Graaf | .............. | A01G 31/001 47/64 |
| 5,331,908 A * | 7/1994 | Loeb | ........................ | A01G 7/00 111/114 |
| 5,791,085 A * | 8/1998 | Szmidt | ................... | A01G 24/00 47/58.1 R |
| 5,930,949 A * | 8/1999 | Tsujimoto | ................ | A01C 1/02 435/430 |
| 6,032,409 A * | 3/2000 | Obonai | ................... | A01H 4/001 47/44 |
| 6,176,037 B1 * | 1/2001 | Muramatsu | .......... | A01G 9/0293 47/64 |
| 6,286,254 B1 * | 9/2001 | Obonai | .................. | A01G 24/00 47/63 |
| 6,615,539 B1 * | 9/2003 | Obonai | .................. | A01G 24/35 47/62 N |
| 8,667,733 B2 * | 3/2014 | Beck | ....................... | A01G 24/00 47/40.5 |
| 10,342,182 B2 * | 7/2019 | Hempenius | ............. | A01G 9/021 |
| 2009/0148025 A1 | 6/2009 | Thrash | | |
| 2011/0167726 A1 * | 7/2011 | Bouwens | .............. | A01G 31/001 47/59 S |
| 2011/0232188 A1 * | 9/2011 | Kennedy | .............. | A01G 31/001 47/59 S |
| 2013/0263508 A1 * | 10/2013 | Cuypers | ............... | A01G 31/001 47/59 S |

FOREIGN PATENT DOCUMENTS

| | | |
|---|---|---|
| WO | 2009011905 A1 | 1/2009 |
| WO | 2010003677 A3 | 1/2010 |
| WO | 2012001130 A1 | 1/2012 |
| WO | 2012028650 A1 | 3/2012 |

OTHER PUBLICATIONS

Russian Office Action for Application No. 2015142538, dated Feb. 23, 2018, pp. 1-4.

* cited by examiner

METHOD FOR GROWING PLANTS

RELATED APPLICATIONS

The present invention is a U.S. National Stage under 35 USC 371 patent application, claiming priority to Serial No. PCT/EP2014/054460, filed on Mar. 7, 2014; which claims priority from EP13158207.4, filed Mar. 7, 2013, the entirety of both of which are incorporated herein by reference.

FIELD OF THE INVENTION

The present invention relates to a coherent growth substrate product, a method of propagating seeds or seedlings, a method of growing plants, and a process of making a growth substrate product

BACKGROUND OF THE INVENTION

It is well known to grow plants commercially outside in soil, such as in a field. The grower has less control over germination of seeds and propagation of plants which are grown outside than over germination of seeds and propagation of plants which takes place in a greenhouse. A commercial grower or propagator has much less control over irrigation and light in the outdoor environment and therefore seeds may germinate and propagate at different rates. This makes it difficult for a grower to bring all of their crops to harvest simultaneously, as the plants do not grow in a consistent way.

It is known to propagate seeds or seedlings in one place and transplant the seedlings elsewhere for further growth to produce a crop. Growth substrate products formed of man-made vitreous fibres are well known in the art. It is known to propagate seeds and seedlings and to grow plants on MMVF growth substrates. For example, WO2012/001130A1 discloses a MMVF growth substrate with opposed top and bottom surfaces and a seed hole extending from the top surface towards the bottom surface, wherein the volume of the growth substrate is not more than 150 cm$^3$ and wherein the seed bed has a width of at least 5 mm. This document describes using MMVF growth substrates to propagate seeds. There is no suggestion of using such MMVF growth substrates for transplanting seedlings into the ground.

The relative capillarity of soil and MMVF growth substrates means that when MMVF growth substrates are positioned in contact with soil, such as when MMVF growth substrates containing seeds or seedlings are planted in soil, water tends to drain from the MMVF growth substrate into the soil. This means the amount of water available to the seed or seedling in the growth substrate is greatly reduced. It would be necessary to saturate the soil with water in order to allow the MMVF substrate to take up water from the soil. When propagation occurs in the outdoor environment, such as in a field, water readily drains from the soil into the water table. This means that a very large level of irrigation would be required in order to saturate the soil and to allow the MMVF growth substrate to take up water from the soil. It is undesirable for environmental reasons to have to use the amount of water that would be required to achieve this level of irrigation. Further, it is impractical to saturate the ground with water in order to achieve the aim of water being available to the seed or seedling in the MMVF substrate.

The alternative to high levels of watering is that the seeds and seedlings do not have enough water available from the MMVF substrate for optimal growth. A seedling has to grow roots through the MMVF substrate, into the soil to reach the available water. This means that the seedling has a period of substandard growth, before its roots reach the soil. This causes variations in the growth of the seedlings into plants which means that it is difficult to achieve consistent growth across a field. Conventional MMVF growth substrates are therefore not a useful growth substrate for transplanting seedlings into the ground.

It is known to use materials to maintain hydration of plants in soil. For example US2009/0145025 discloses the use of a substrate, such as sand, coated with a hydrophilic polymer in the vicinity of a root system of a plant. The purpose of this is to provide a plant with relief from the stress of dehydration between waterings as the plant grows. A large amount of the coated substrate is required to provide the plant with sufficient water to reduce the stress of dehydration between waterings. It is undesirable to replace this quantity of soil with the coated substrate in commercial practice. Furthermore, it is time consuming to apply such a substrate to the vicinity of a root system of plants and it is difficult to achieve consistency of application of the substrate. This makes it difficult for a grower to bring all of their crops to harvest simultaneously, as the plants do not grow in a consistent way.

U.S. Pat. No. 4,241,537 describes a gel soil plug in the form of a monolithic, cross-linked, hydrophilic polyurethane gel. The gel can be reinforced by fibres such as wood, carbon, glass, polyolefin, polyester, polyamide, cellulosic and polyvinyl alcohol fibres, mineral wool fibres and metal fibres. It is difficult to transplant seedlings in such gel plugs because the plugs are easily damaged due to their low density. This makes them particularly difficult to transplant by machine as damage to the gel plugs results in the seedlings being damaged. This means that it is difficult to achieve uniform propagation of seedlings in these gel plugs. Further, it is difficult to achieve a good distribution of nutrients in gel plugs as there is no free flow through the gel. This can cause the roots to move towards the areas with higher level of nutrients which results in a sub-optimal root net.

U.S. Pat. No. 3,973,355 discloses a foam block having an insert of a hydrophilic plant growth matrix. The growth matrix is a dried, gelled plant growth particulate material mix which may comprise fibrous material such as asbestos, glass wool fibre, wood fibre or sphagnum moss. A seed may germinate and the roots of the seedling can grow through the foam block. These blocks are not disclosed for use in the ground. A disadvantage of using such a foam block and transplanting a seedling in the foam block into the ground is that if the ground water level is high, the foam block will rise up out of the ground, as it can float in the water. This means that the seedlings will not stay where they are planted. Further, foam blocks do not have a 100% open pore structure and therefore the amount of water they can absorb is limited.

There is a need for a way to control the propagation of seeds and seedlings so that an entire crop is ready to be harvested at the same time. Further there is a need for a growth substrate that is suitable for propagating seeds or seedlings which retains water when placed in contact with the ground. Further, there is a need for a growth substrate which keeps water available to a seedling when the growth substrate is placed in contact with the ground. Further, there is a need for a growth substrate which has the resilience and mechanical strength to allow a seedling to be transplanted without being damaged. Further there is a need for a growth substrate which will not float if the ground water level is high. It is also desirable to provide such a product which is environmentally acceptable and economical in terms of its production. The present invention solves the above-detailed problems.

SUMMARY OF INVENTION

In a first aspect of the invention, there is provided a coherent propagation growth substrate product formed of man-made vitreous fibres (MMVF), the product having two opposed top and bottom surfaces and at least one cavity which is open at the top surface and which extends from the top surface towards the bottom surface, wherein a superabsorbent polymer is provided in the cavity.

In a second aspect of the invention, there is provided a method of cultivating plants comprising:

propagating a seed by providing a product as defined in the first aspect of the invention, positioning a seed in the cavity, irrigating the growth substrate product and allowing germination and growth of the seed to form a seedling;

transplanting the seedling by positioning the growth substrate product on the ground; and irrigating the growth substrate product and allowing growth of the seedling and allowing the seedling to root into the ground.

In a third aspect of the invention, there is provided a method of cultivating plants comprising:

providing a product as defined in in the first aspect of the invention, positioning a seedling in the cavity, irrigating the growth substrate product and allowing growth of the seedling;

transplanting the seedling by positioning the growth substrate product on the ground; and irrigating the growth substrate product and allowing growth of the seedling and allowing the seedling to root into the ground.

In a fourth aspect of the invention, there is provided a process of making a growth substrate product as defined in the first aspect of the invention, the process comprising providing a coherent mass of MMVF having opposed top and bottom surfaces and forming in the mass of MMVF a cavity extending from the top surface towards the bottom surface, and providing a superabsorbent polymer in the cavity.

DETAILED DESCRIPTION OF THE INVENTION

Growth Substrate Product

The present invention relates to a coherent propagation growth substrate product formed of man-made vitreous fibres (MMVF), the product having two opposed top and bottom surfaces and at least one cavity which is open at the top surface and which extends from the top surface towards the bottom surface, wherein a superabsorbent polymer is provided in the cavity.

The growth substrate product of the invention is formed of MMVF. The MMVF can be of the conventional type used for formation of known MMVF growth substrates. It can be glass wool or slag wool but is usually stone wool. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general it can be any of the types of man-made vitreous fibre which are conventionally known for production of growth substrates.

Fibre diameter is often in the range of 3 to 20 microns, in particular 5 to 10 microns, as conventional.

The growth substrate is in the form of a coherent mass. That is, the growth substrate is generally a coherent matrix of man-made vitreous fibres, which has been produced as such, but can also be formed by granulating a slab of mineral wool and consolidating the granulated material.

The MMVF growth substrate usually comprises a binder, often an organic binder, which is generally heat-curable. The growth substrate is preferably a coherent matrix of MMVF connected by cured binder. The binder can be an organic hydrophobic binder, and in particular it can be a conventional heat-curable (thermosetting), hydrophobic binder of the type which has been used for many years in MMVF growth substrates (and other MMVF-based products). This has the advantage of convenience and economy. Thus, the binder is preferably a phenol formaldehyde resin or urea formaldehyde resin, in particular phenol urea formaldehyde (PUF) resin.

The binder can be itself hydrophilic. A hydrophilic binder does not require the use of a wetting agent. A wetting agent can nevertheless be used to increase the hydrophilicity of a hydrophilic binder in a similar manner to its action in combination with a hydrophobic binder. This means that the MMVF substrate will absorb a higher volume of water than if the wetting agent is not present. Any hydrophilic binder can be used for example the binder disclosed in WO2012/028650.

In the case where the binder itself is hydrophilic then wetting agent is not normally used. When the binder is hydrophobic, in order to ensure that the substrate is hydrophilic, a wetting agent is additionally included in the MMVF substrate. A wetting agent will increase the amount of water that the MMVF substrate can absorb. The use of a wetting agent in combination with a hydrophobic binder results in a hydrophilic MMVF substrate. The wetting agent may be any of the wetting agents known for use in MMVF substrates that are used as growth substrates. For instance it may be a non-ionic wetting agent such as Triton X-100 or Rewopal. Some non-ionic wetting agents may be washed out of the MMVF substrate over time. It is therefore preferable to use an ionic wetting agent, especially an anionic wetting agent, such as linear alkyl benzene sulphonate. These do not wash out of the MMVF substrate to the same extent.

Levels of wetting agent are preferably in the range 0 to 5 wt %, based on the weight of the MMVF substrate, in particular in the range 0.01 to 2 wt %, especially in the range 0.05 to 0.5 wt %.

The MMVF growth substrate may contain other types of conventional additives in addition to binder and wetting agents, for instance salts such as ammonium sulphate and adhesion promoters such as silanes.

The binder is generally present in the MMVF growth substrate in amounts of from 0.1 to 10 wt % based on the substrate, usually 0.5 to 6 wt %, most preferably 1.5 to 5 wt %.

The average overall density of the MMVF is preferably 50 to 140 kg/m$^3$, such as 65 to 120 kg/m$^3$, more preferably 80-100 kg/m$^3$. The density is the average overall density of the MMVF as such, that is the density of the MMVF excluding the cavity. The cavity is not taken into account when calculating the density of the MMVF substrate.

In preferred embodiments there is a region surrounding the cavity which has higher density than the remainder of the growth substrate product. This region preferably extends at least 0.5 mm, preferably at least 1 mm, from the surface at the cavity, but generally not more than 2 mm. The density of this densified region is preferably at least 5%, more preferably at least 10%, greater than the average density of the product as a whole. Most preferably it is in the range of 10 to 15% greater than the average density of the product as a whole. An advantage of the region surrounding the cavity having a higher density than the remainder of the growth substrate product is that the water content of the higher density region will be higher than the rest of the MMVF part of the substrate. This keeps the water within the MMVF part of the substrate concentrated around the cavity.

The MMVF may be made by any of the methods known to those skilled in the art for production of MMVF growth substrate products. In general, a mineral charge is provided, which is melted in a furnace to form a mineral melt. The melt is then formed into fibres by means of centrifugal fiberisation e.g. using a spinning cup or a cascade spinner, to form a cloud of fibres. These fibres are then collected and consolidated. Binder and optionally wetting agent are usually added at the fiberisation stage by spraying into the cloud of forming fibres. These methods are well known in the art.

The growth substrate product preferably has a volume in the range 3 to 1500 cm$^3$, such as 5 to 350 cm$^3$, preferably 8 to 350 cm$^3$. The growth substrate product may be in the form of a product conventionally known as a plug, or in the form of a product conventionally known as a block.

The growth substrate product may have dimensions conventional for the product type commonly known as a plug. Thus it may have height from 20 to 35 mm, often 25 to 28 mm, and length and width in the range 15 to 25 mm, often around 20 mm. In this case the substrate is often substantially cylindrical with the end surfaces of the cylinder forming the top and bottom surfaces of the growth substrate.

The volume of the growth substrate product in the form of a plug is preferably not more than 150 cm$^3$. In general the volume of the growth substrate product in the form of a plug is in the range 3 to 150 cm$^3$ and preferably not more than 100 cm$^3$, more preferably not more than 80 cm$^3$, in particular not more than 75 cm$^3$, most preferably not more than 70 cm$^3$.

The minimum distance between the top and bottom surfaces of a plug is preferably less than 60 mm, more preferably less than 50 mm and in particular less than 40 mm or less.

Another embodiment of a plug has height from 30 to 50 mm, often around 40 mm and length and width in the range 20 to 40 mm, often around 30 mm. The growth substrate in this case is often of cuboid form. In this first case the volume of the growth substrate is often not more than 50 cm$^3$, preferably not more than 40 cm$^3$.

Alternatively the growth substrate may be of the type of plug described as the first coherent MMVF growth substrate in our publication WO2010/003677. In this case the volume of the growth substrate product is most preferably in the range to 10 to 40 cm$^3$.

The growth substrate product may have dimensions conventional for the product type commonly known as a block. Thus it may have height from 5 to 20 cm, often 10 to 15 cm, and length and width in the range 10 to 80 cm, often 30 to 50 cm. In this case the substrate is often substantially cuboidal. The volume of the growth substrate product in the form of a block is preferably in the range 300 to 1500 cm$^3$.

The height is the vertical height of the growth substrate when positioned as intended to be used and is thus the distance between the top surface and the bottom surface. The top surface is the surface that faces upwardly when the product is positioned as intended to be used and the bottom surface is the surface that faces downwardly (and on which the product rests) when the product is positioned as intended to be used.

In general, the growth substrate may be of any appropriate shape including cylindrical, cuboidal and cubic. Usually the top and bottom surfaces are substantially planar.

Cavity

The cavity is preferably a blind aperture. The cavity preferably extends 20 to 80% through the height of the growth substrate, preferably 30 to 75%, most preferably 50 to 70%. That is, the depth of the cavity is preferably in the range of 20 to 80%, preferably 30 to 75%, most preferably 50 to 70%, of the height of the growth substrate. If the cavity extends less than 20% of the way through the growth substrate, there may be insufficient space for the presence of enough super absorbent polymer to provide water to the seed or seedling. If the cavity extends greater than 80% of the way through the product, there is a risk that the superabsorbent polymer will not stay within the product and/or that the mechanical strength of the product will be insufficient.

In an alternative embodiment, the cavity may extend the entire distance through the height of the growth substrate product, and thus be open at the bottom surface as well as at the top surface. An advantage of a cavity which extends all the way through the height of the growth substrate product is that the roots of the seedling can pass directly out of the growth substrate product. Where the cavity extends all the way through the height of the growth substrate product, the superabsorbent polymer may be retained in the cavity by varying the cross-sectional area of the cavity so that it is sufficiently narrow at the bottom of the growth substrate product that the superabsorbent polymer is prevented from falling out of the cavity.

The volume of the cavity is preferably 3 to 60% of the volume of the growth substrate product, preferably 10 to 50%, preferably 15 to 40%. If the volume of the cavity is less than 3% of the volume of the product, there is a risk that there will be insufficient space for the cavity to contain enough super absorbent polymer to provide a suitable amount of water available in the product when the product is in contact with the soil. If the volume of the cavity is more than 50% of the volume of the product, there is a risk that the product will not have sufficient mechanical strength to allow it to be handled by machinery. The volume of the growth substrate product is the volume of MMVF that would make up the product if the cavity were not present, i.e. if the cavity were instead filled with MMVF.

The open end of the cavity at the top surface of the growth substrate product may have any shape, such as circular, elliptical, square, rectangular, or any other shape. For ease of manufacture, the shape of the cavity at its top end is preferably circular.

Preferably the cross-sectional area of the open end of the cavity at the top surface of the growth substrate product is 10 to 80% of the cross-sectional area of the whole top surface of the growth substrate product, preferably 20 to 50%. The cross-sectional area of the whole top surface of the growth substrate product includes the cross-sectional area of the cavity at the top surface of the growth substrate product.

The cavity may have a substantially continuous cross-sectional area throughout its depth. "Substantially continuous" means that the cross-sectional area does not change by more than 10%, preferably not more than 5%, more preferably not more than 2%. The advantage of the cavity having a substantially continuous cross-sectional area is that the space available for the superabsorbent polymer is consistent. Cavities of such a configuration can also be more straightforward to manufacture.

Another preferred configuration for the cavity is inverse conical or inverse frustoconical.

The cavity may have a narrower cross-sectional area at the top of the growth substrate product and a wider cross-sectional area, on average, throughout the rest of the cavity. This arrangement means that the amount of superabsorbent polymer exposed to the external environment is reduced. This means that, in use, less water from the superabsorbent polymer is lost via evaporation. The wider cross-sectional area, on average throughout the rest of the cavity, means that there is a greater space for the superabsorbent polymer, and thus there is more water available to the seed or seedling.

Preferably a single growth substrate product is provided with one cavity. The advantage of this arrangement is that it allows individual seedlings to be transplanted into the ground in the growth substrate product and positioned in such a way that there is enough space between seedlings for the seedlings to mature into plants.

Alternatively, each growth substrate product may have more than one cavity, such as 2 to 100 cavities, preferably 5 to 50 cavities, preferably 10 to 30 cavities. A single product of this sort may be used for propagation of multiple seeds. An advantage of having more than one cavity in a product is that several seedlings can be transplanted into the ground by placing a single growth substrate into the ground. This reduces the number of growth substrates a grower needs to transplant.

Alternatively a product may be provided which is an array of connected growth substrate products of the invention, connected for instance by grooves so that it is possible to break off one or more growth substrate products, each containing a single cavity, either by hand or using some sort of blade or other suitable equipment.

Superabsorbent Polymer

Superabsorbent polymers, or SAPs, are hydrophilic materials which can absorb fluid and retain it under pressure without dissolution in the fluid being absorbed. The materials used are well-known. They are generally all synthesized by one of two routes. In the first, a water soluble polymer is cross-linked so that it can swell between cross-links but not dissolve. In the second, a water-soluble monomer is co-polymerized with a water insoluble monomer into blocks. The earliest superabsorbent materials were saponified starch graft polyacrylonitrile copolymers. Synthetic superabsorbers include polyacrylic acid, polymaleic anhydride-vinyl monomer superabsorbents, starch-polyacrylic acid grafts, polyacrylonitrile-based polymers, cross-linked polyacrylamide, cross-linked sulfonated polystyrene, cross-linked n-vinyl pyrrolidone or vinyl pyrrolidone-acrylamide copolymer, and polyvinyl alcohol superabsorbents. These polymers absorb many times their own weight in aqueous fluid. Additional superabsorbent polymers include sodium propionate-acrylamide, poly(vinyl pyridine), poly(ethylene imine), polyphosphates, poly(ethylene oxide), vinyl alcohol copolymer with acrylamide, and vinyl alcohol copolymer with acrylic acid acrylate.

The ability of a superabsorbent polymer to absorb water depends on the ionic concentration of the water. A superabsorbent polymer will generally absorb more distilled water than undistilled water. Preferably the superabsorbent polymers used in the present invention swell to a volume from 2 to 10 times their dry volume when fully hydrated in distilled water, preferably 3 to 6 times their dry volume.

The choice of the most appropriate amount of superabsorbent polymer that is to be provided in a cavity of a growth substrate product of the present invention depends on whether the superabsorbent polymer is provided in dry form, hydrated form, or partially hydrated form. The superabsorbent polymer may be provided in the cavity in dry form, hydrated form or partially hydrated form. When the SAP is in dry form it is usually provided in the form of granules, which are generally flowable when dry. "Hydrated form" means that the superabsorbent polymer has absorbed at least 90% of the maximum amount of water it is capable of holding. "Partially hydrated form" means that the superabsorbent polymer has absorbed some water, but is able to absorb more water. "Dry form" means that the SAP comprises less than 5 wt % water, preferably less than 3 wt % water, preferably less than 1 wt % water, preferably no water.

When the superabsorbent polymer is hydrated, preferably superabsorbent polymer takes up 20 to 100% of the volume of the cavity, more preferably 30 to 95%, more preferably 50 to 80%. The more hydrated superabsorbent polymer that is present, the more water there is available for the seed or seedling. It is preferable that when hydrated, the superabsorbent polymer does not swell beyond the volume of the cavity. This is to ensure that the seed or seedling is not pushed out of the cavity.

The volume of hydrated SAP present in the growth substrate product can be equated to the amount of water present in plug at suction pressure 2. For example, if 30% of the volume of the growth substrate product is SAP, this means that the product contains 30% water. Preferably 3 to 60% of the volume of the growth substrate product is hydrated SAP, preferably 10 to 50%, preferably 15 to 40%. This means the amount of water made available to the seed or seedling can be controlled by the amount of hydrated SAP present.

Dry SAP may increase in volume by 2 to 10 times when it is hydrated, preferably the dry SAP increases from 3 to 6 times its volume when it is hydrated. The amount of dry SAP required can therefore be adjusted based on the volume increase on swelling.

Method of Propagation

The present invention provides a method of propagation of seeds comprising providing a product as described above, positioning a seed in the cavity, irrigating the growth substrate product and allowing germination and growth of the seed to form a seedling.

The present invention provides a method of propagation of seedlings comprising providing a product as described above, positioning a seedling in the cavity, irrigating the growth substrate product and allowing growth of the seedling.

The seed or seedling is preferably positioned on top of the superabsorbent polymer. Prior to positioning the seed or seedling, the superabsorbent polymer may be in dry form, hydrated form, or partially hydrated form.

Irrigation may occur by direct irrigation of the growth substrate product, that is, water is supplied directly to the growth substrate product, such as by a dropper, sprinkler or other irrigation system. The amount of irrigation required depends on the state of the superabsorbent polymer. If the superabsorbent polymer is in dry form, more water is required to irrigate the growth substrate product than if the superabsorbent polymer is in partially hydrated form or hydrated form. Least water is required to irrigate the growth substrate product when the superabsorbent polymer is provided in hydrated form.

The seed or seedling will obtain water from the superabsorbent polymer in the product. Some water will also be available in the MMVF of the product. The irrigation of the seed or seedling may be less frequent than in the absence of a superabsorbent polymer because the superabsorbent polymer acts as a reservoir of water.

The seed or seedling may be irrigated every 2 to 21 days prior to transplantation of the growth substrate product containing the seedling to the soil. The frequency of irrigation depends on the plant being grown and the season. For example, more irrigation is required during summer.

The seed or seedling is preferably grown for 8 to 100 days in the growth substrate product before the growth substrate product containing the seedling is transplanted into the soil, preferably 14 to 70 days. The length of time before transplantation of the growth substrate product containing the seedling into the soil is determined by the plant being grown and the season. For example, transplantation occurs earlier in summer than in winter.

The growth substrate product of the invention is particularly useful for growing cucumbers, tomatoes, gherkins, water melons, cabbages, peppers, chillies, aubergines, pumpkins, cauliflowers, broccoli, strawberries and artichokes.

Method of Cultivating Plants

The present invention relates to a method of cultivating plants comprising:

providing a product as defined above, positioning a seedling in the cavity, irrigating the growth substrate product and allowing growth of the seedling;

transplanting the seedling by positioning the growth substrate product on the ground; and irrigating the growth substrate product and allowing growth of the seedling and allowing the seedling to root into the ground.

It will be understood by the skilled person that in the present invention, the ground comprises soil.

The seedling may have been grown from a seed in a growth substrate product of the invention. Alternatively the seed may have been germinated elsewhere and the resulting seedling transferred to a growth substrate product of the invention.

The growth substrate product has the resilience and mechanical strength to allow a seedling to be transplanted to the ground without being damaged. This is important for seedlings transplanted by hand, and particularly important for seedlings transplanted by machinery. If seedlings are damaged during transplantation to the ground, this means that the growth of the plants is not uniform, and therefore a grower is unable to harvest all of their crops simultaneously. It is an advantage of the invention that the seedlings are protected by the growth substrate product during transplantation to the ground to prevent the seedlings being damaged. This increases the uniformity of the growth of the plants and this allows the grower to bring their crops to harvest simultaneously.

The growth substrate product may be placed directly on the ground so that only the bottom surface of the product is in contact with the ground. This makes it easier to remove the growth substrate product from the ground after cropping, than if the product was buried in the ground.

The growth substrate product may be completely buried in the ground so that all external surfaces of the product are in contact with the ground. The seedling will be at least partially above the ground. This has the advantage of securing the growth substrate product in the ground so it is less likely to be accidently moved from its initial position in the ground, such as by the wind or by surface water.

The growth substrate product may be partially buried in the ground so that the bottom surface and part of the sides of the product are in contact with the ground. This has the advantage of securing the growth substrate product in the ground so it is less likely to be accidently moved from its initial position in the ground, such as by the wind or by surface water. Further this makes it easier to remove the growth substrate product from the ground after cropping, than if the product was completely buried in the ground.

Irrigation may occur by direct irrigation of the growth substrate product, that is, water may be supplied directly to the growth substrate product, such as by a dropper, sprinkler or other irrigation system. The amount of irrigation required depends on the state of the superabsorbent polymer. If the superabsorbent polymer is in dry form, more water is required to irrigate the growth substrate product than if the superabsorbent polymer is in partially hydrated form. Least water is required to irrigate the growth substrate product when the superabsorbent polymer is provided in hydrated form.

Irrigation may occur by indirect irrigation of the growth substrate product, such as by irrigating the surrounding ground. This is less preferred as the MMVF has a lower capillarity than soil, therefore the soil needs to be very wet before the MMVF will absorb water from the soil.

Preferably the growth substrate product is irrigated directly before it is positioned on the ground in order to hydrate the superabsorbent polymer.

The growth substrate products of the invention are particularly useful when the ground contains less than 40 wt % water, such as less than 30 wt % water. This is because when the ground contains less than 40 wt % water, the majority of the water within the MMVF of the growth substrate products will drain from the MMVF material. This is because the relative capillarity of the soil and the MMVF material causes water to drain from the MMVF material into the soil. It is therefore particularly useful to have a growth substrate of the present invention containing a super absorbent polymer as the water within the super absorbent polymer does not drain into the soil and thus remains available for the seed or seedling. The growth substrate of the present invention is still useful when the soil contains higher levels of water, such as 50 wt % water, because the seed or seedling has enough water available in the super absorbent polymer. The growth substrate product of the invention is useful in conditions where the water content of the soil changes as the super absorbent polymer provides water to the seed or seedling in a consistent way. This will also help improve the consistency of a crop, as a seed or seedling will have access to similar levels of water, whether a particular art of a field is drier or wetter.

Seeds used in the present invention may be coated seeds or uncoated seeds. Seed are positioned in growth substrate products of the present invention and the position of the seeds can be adjusted. This is an advantage over growth substrate products made from peat as uncoated seeds can stick to peat and can be difficult to reposition.

The growth substrate product containing a seedling is preferably transplanted to the ground and grown for at least 5 days, preferably at least 10 days, such as 10 to 90 days or more.

Plants types particularly suitable for growth in growth substrates of the present invention include cucumbers, tomatoes, gherkins, water melons, cabbages, peppers, chillies, aubergines, pumpkins, cauliflowers, broccoli, strawberries and artichokes.

Process of Making a Growth Substrate Product

The invention provides a process of making a growth substrate product as described above, the process comprising providing a coherent mass of MMVF having opposed top and bottom surfaces and forming in the mass of MMVF a cavity extending from the top surface towards the bottom surface, and providing a superabsorbent polymer in the cavity.

The cavity is preferably formed by punching or drilling. An array of cavities may be formed by holding one or more coherent mass of MMVF in position in a tray and forming the array cavities by punching or drilling.

Where the cavity is formed by punching, namely a method which does not result in removal of material from the product but instead displaces material, this results in increased density of the material surrounding the cavity.

The punching equipment will normally have a pointed end, and could have different shapes, e.g. mandrel-like. The punching equipment can for instance have a width corresponding to the width of the desired cavity. When making the cavity in a growth substrate product, the punching equipment will be forced into the top surface of the growth substrate product and thereby displace the MMVF outwardly. This way the displaced material will create a higher density in the growth substrate product surrounding the seed hole than for the rest of the growth substrate product.

Where the cavity is formed by drilling, it is possible to create a cavity which has a narrower cross-sectional area at the top of the growth substrate product and a wider cross-sectional area, on average, throughout the rest of the cavity. Drilling gives more flexibility for producing a cavity with a non-uniform cross-sectional area. The force applied to a growth substrate produced by drilling is easier to control than the force applied by punching and therefore less damage occurs to the growth substrate product.

In an embodiment a plate equipped with hollow needles, adapted to fit with the number of MMVF substrates in a tray, is provided. The needles are coupled to a hopper via tubes for the delivery of SAP granules. It is possible to either employ a weighing mechanism for getting the right amount of granules in the tubes, to use vision scan (with cameras) or have a fixed volume of granules which are filled and delivered by the machine via the tubes. The latter is preferred. The needle will then punch at least one hole in each MMVF substrate and at the same time deliver the SAP to the punched hole via the hollow needles via the tubes. Alternatively, a machine could punch the holes first and the SAP granules may be machine delivered through a hollow tube. In either case, suction pressure could be provided to the bottom of the MMVF substrate to suck the granules into the bottom of the cavity.

Providing the SAP in dry granular form has the advantage of allowing the provision of a known number of granules in a cavity. Further, providing the SAP in dry form means that the propagator is supplied with a clean inert growth substrate product. Supplying the SAP in hydrated form to a propagator increases the risk of unwanted micro-organisms growing in the growth substrate. The SAP may also be provided as a dry powder.

Alternatively, the superabsorbent polymer is provided in hydrated form in the cavity, and the superabsorbent polymer is preferably extruded into the cavity. Providing the superabsorbent polymer in hydrated form means that it is easy to see how much of the cavity has been filled with superabsorbent polymer because the polymer will not swell any further. The superabsorbent polymer may alternatively be provided in a partially hydrated form.

DETAILED DESCRIPTION OF DRAWINGS

Figure 1:
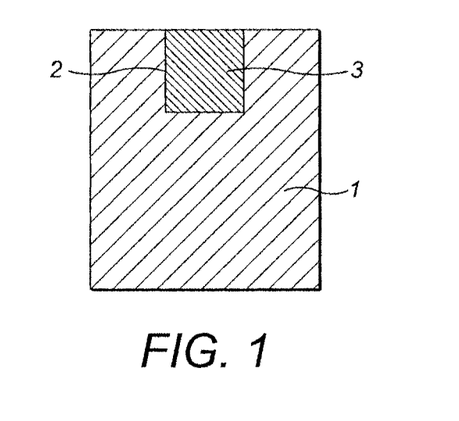
FIG. 1 shows a vertical cross-section of a growth substrate product of the invention.

FIG. 1 shows a vertical cross-section of a growth substrate product 1 of the invention. The cavity 2 has a rectangular vertical cross-section and extends 30% of the height through the product (the depth of the cavity is 30% of the height of the product). Such a cavity could be formed by drilling or punching a coherent MMVF substrate. The cavity 2 is filled with superabsorbent polymer 3. A seed or seedling may be placed in the cavity 2.

Figure 2:
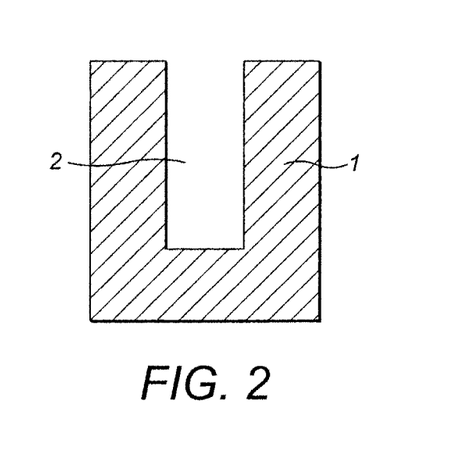
FIG. 2 shows a vertical cross-section of a further growth substrate product of the invention.

FIG. 2 shows a vertical cross-section of a growth substrate product 1 of the invention. The cavity 2 is shown with a rectangular cross-section extending 80% of the height through the product. Such a cavity could be formed by drilling or punching a coherent MMVF substrate. The cavity 2 has a number of dry superabsorbent polymer granules 4 at the bottom. A seed or seedling may be placed in the cavity 2.

Figure 3:
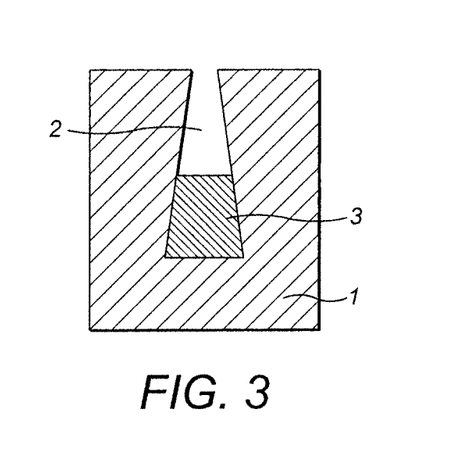
FIG. 3 shows a vertical cross-section of another growth substrate product of the invention.

FIG. 3 shows a vertical cross-section of a growth substrate product 1 of the invention. The cavity 2 has a narrower width at the top of the cavity than in the lower portion of the cavity. The cavity 2 extends 70% of the height through the product. Such a cavity could be formed by drilling a coherent MMVF substrate. The cavity 2 is partially filled with hydrated superabsorbent polymer 3. A seed or seedling may be placed in the cavity 2.

Figure 4:
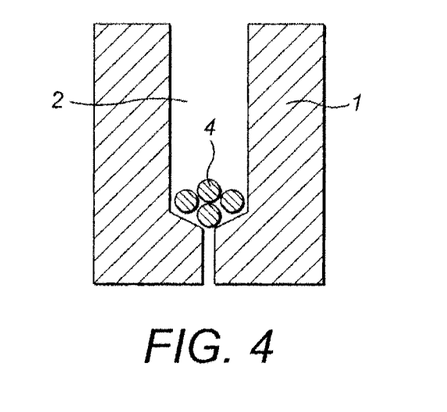
FIG. 4 shows a vertical cross-section of yet a further growth substrate product of the invention.

FIG. 4 shows a vertical cross-section of a growth substrate product 1 of the invention. The cavity 2 is shown extending the whole way through the product. The cavity has a greater width at the top of the cavity than at the bottom of the cavity. The cavity 2 comprises a number of dry superabsorbent polymer granules 4 which are lodged part way down the cavity 2 and are of sufficient size not to fall out of the cavity 2. A seed or seedling may be placed in the cavity 2.

Figure 5:
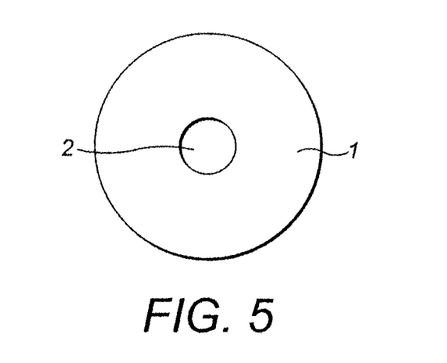
FIG. 5 shows a plan view of yet a further growth substrate product of the invention.

FIG. 5 shows a plan view of yet a further growth substrate product of the invention. The cavity 2 is shown positioned substantially centrally in the cylindrical growth product 1.

Figure 6:
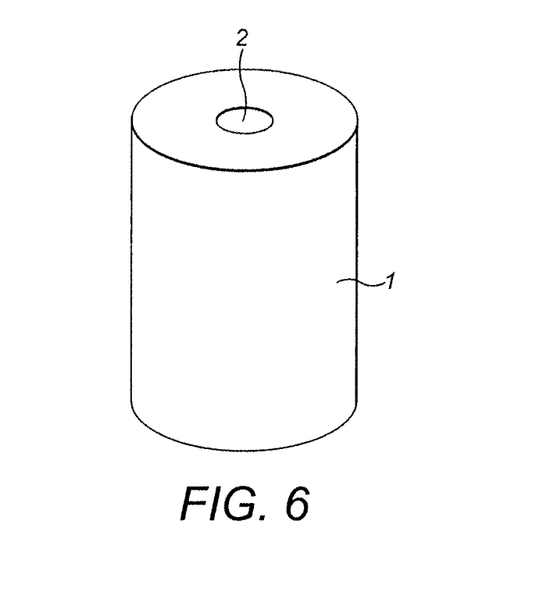
FIG. 6 shows a perspective view of yet a further growth substrate product of the invention.

FIG. 6 shows a perspective view of yet a further growth substrate product of the invention. The growth substrate 1 is shown with a cavity 2.

Figure 7:
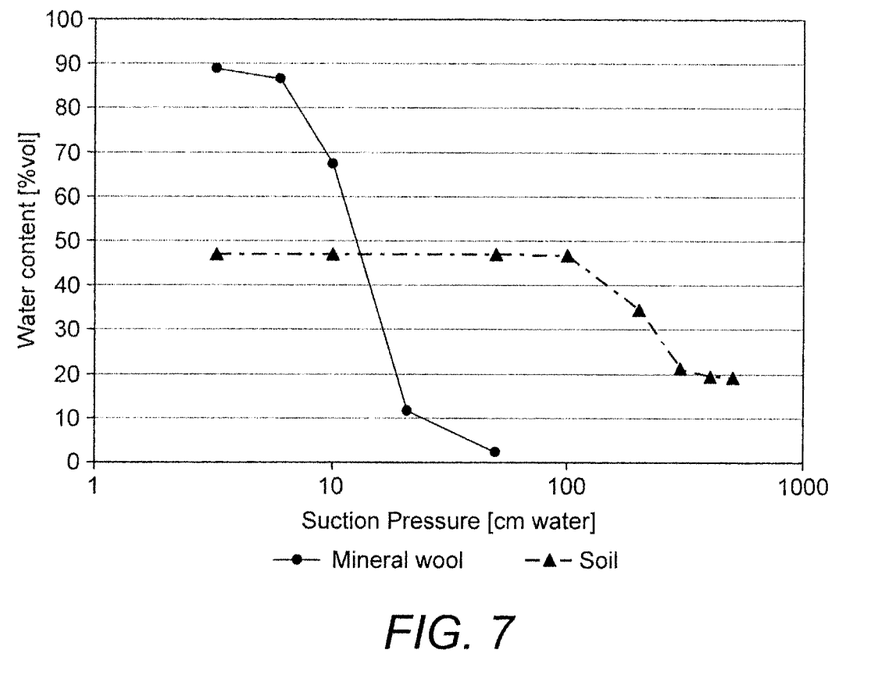
FIG. 7 shows the water holding capacity of an MMVF substrate compared to silt loam as discussed in Example 1 below.

FIG. 7 shows water retention curves for a MMVF substrate and silt loam.

The invention will now be described with reference to the following non-limiting examples.

Example 1

The water holding capacity of a MMVF substrate and silt loam were tested in accordance with EN 13041-1999. The MMVF substrate was a stone wool fibre product with a phenol-urea formaldehyde (PUF) binder and a non-ionic surfactant wetting agent. The results are shown in FIG. 7.

The MMVF substrate has a maximum water content of 90% vol. When the MMVF substrate gives off water, it retains about 2-5% vol of water. This means that the MMVF substrate has a buffering capacity of 85-87% vol. This shows that the MMVF substrate has a high maximum water content, as well as a lower water retention level.

The maximum water content of the silt loam is lower than the MMVF substrate. The capillarity of the silt loam is much higher than that of the MMVF substrate, which means a suction pressure of several meters is needed to withdraw water from the silt loam. This means that the silt loam soil will easily drain water from the MMVF substrate as soon as the soil is no longer fully saturated. This demonstrates that water will drain from a MMVF substrate into the ground when the soil is not saturated.

Example 2

SAP (Superabsorbent Polymer) Examples

Plugs made of a stone wool fibre product with a cured hydrophilic binder were provided. The plugs were cylindrical with a height of 28 mm and a diameter of 20 mm. Each plug was drilled to form a cylindrical cavity that had a height of 15 mm and a diameter of 5 mm. In the examples of the invention, five dry granules of superabsorbent polymer were positioned at the bottom of the cavity. The plugs were completely saturated with nutrient solution. A tomato seed was planted in each plug. After 14 days of growth, the plugs were planted in a garden soil mixture with a water content of either 30% or 50%. After a further 3, 7 and 14 days the weights of the plants were measured.

Reference Examples

The reference examples were plugs made of a stone wool fibre product with a cured hydrophilic binder. The plugs were cylindrical with a height of 28 mm and a diameter of 20 mm. No cavity was created in the reference samples and no SAP was present. The plugs were completely saturated with nutrient solution. A tomato seed was planted in each plug. After 14 days of growth, the plugs were planted in a garden soil mixture with a water content of either 30% or 50%. After a further 3, 7 and 14 days the weights of the plants were measured.

Results:

TABLE 1

Overview planted tomato seeds in plugs

| Planted tomato seeds | Reference Number of plants | SAP Number of plants |
|---|---|---|
| Planted | 120 | 112 |
| Usable | 91 (76%) | 90 (80%) |
| Withered | 18 (15%) | 13 (12%) |
| Not germinated | 11 (9%) | 9 (8%) |

Table 1 shows that there were a greater proportion of usable plants when the SAP plugs were used than when the reference plugs were used.

TABLE 2

Average weight of the plants

| | | Reference | | | SAP | | |
|---|---|---|---|---|---|---|---|
| % | Days | Plateau 1 g. | Plateau 2 g. | Average g. | Plateau 1 g. | Plateau 2 g. | Average g. |
| 30 | 3 | 0.64 | 0.55 | 0.60 | 0.45 | 0.49 | 0.47 |
| | 7 | 0.87 | 0.78 | 0.83 | 0.63 | 0.68 | 0.66 |
| | 14 | 0.61 | 0.94 | 0.77 | 0.62 | 1.04 | 0.83 |
| 50 | 3 | 0.66 | 0.61 | 0.64 | 0.55 | 0.52 | 0.54 |
| | 7 | 0.85 | 0.81 | 0.83 | 0.79 | 0.74 | 0.77 |
| | 14 | 0.81 | 0.99 | 0.90 | 0.80 | 1.05 | 0.92 |

Table 2 shows that when the water content of the soil was 30%, after both 3 and 7 days, the reference plants seem to perform better than the SAP plants. However after 14 days the SAP plants perform better than the reference plants.

Table 2 shows that when the water content of the soil was 50%, after both 3 and 7 days, the reference plants seem to perform better than the SAP plants. However after 14 days the SAP plants perform about the same as the reference plants.

Example 1 shows that the suction pressure of silt loam and MMVF is equal at about 50% water content. This means that the water does not drain from the MMVF plugs when the water content of the soil is 50%. This means that there is the same level of water available in the MMVF substrate in both the SAP plugs and the reference plugs. The SAP therefore has a negligible effect when the water content of the soil is 50%. When the water content of the soil is 30%, water will drain from the MMVF to the soil.

The plants were larger when a larger amount of water is available as shown by comparing the values at 30% water content in the soil and 50% water content in the soil. This shows that when the soil contains 50% water, the growth substrate product contains sufficient water to maintain the plant and the SAP has negligible effect as water is maintained in the MMVF part of the plug. When the soil contains 30% water, water drains from the MMVF part of the plug, but is retained in the SAP. This means that the seed and seedling have access to the water in the SAP and thus the SAP has a positive effect on the growth of the plant. This shows the advantage of the plugs containing SAP when water drains from the MMVF part of the plug into the soil due to the higher suction pressure of soil.

The results therefore show that the plugs of the invention achieve the aim of providing a water source to seedlings transplanted into the soil when the water content in the soil is less than the suction pressure of MMVF.

It will be appreciated by the skilled person that any of the preferred features of the invention may be combined in order to produce a preferred method, product or use of the invention.

The invention claimed is:

1. A method of cultivating plants comprising:
providing a coherent propagation growth substrate product formed of man-made vitreous fibres (MMVF), the product having a top surface which is opposed to a bottom surface and at least one cavity which is open at the top surface and which extends from the top surface towards the bottom surface, wherein the growth substrate product includes a region surrounding the cavity which has a higher density than the remainder of the growth substrate product;

placing, in the at least one cavity, a superabsorbent polymer that is in dry, flowable form;

positioning a seed in the cavity, irrigating the growth substrate product and allowing germination and growth of the seed to form a seedling;

transplanting the seedling by positioning the growth substrate product on the ground; and irrigating the growth substrate product and allowing growth of the seedling and allowing the seedling to root into the ground.

2. A method according to claim 1, wherein the depth of the cavity is 20 to 80% of a height of the growth substrate.

3. A method according to claim 1, wherein a volume of the growth substrate is in the range 3 to 150 cm$^3$.

4. A method according to claim 1, wherein a volume of the growth substrate is in the range 300 to 1500 cm$^3$.

5. A method according to claim 1, wherein a volume of the cavity is 3% to 60% of the volume of the growth substrate.

6. A method according to claim 5, wherein a volume of the cavity is 10% to 50% of the volume of the growth substrate.

7. A method according to claim 1, wherein the MMVF has an average density of from 50 to 140 kg/m$^3$.

8. A method according to claim 1, wherein the superabsorbent polymer is in dry granular form.

9. A method according to claim 1, wherein the at least one cavity extends the entire distance through the height of the growth substrate product and wherein the at least one cavity has a varying cross-sectional area such that the at least one cavity is sufficiently narrow at the bottom of the growth substrate product that the superabsorbent polymer is prevented from falling out of the at least one cavity.

* * * * *